United States Patent
Burton et al.

(10) Patent No.: US 9,266,087 B2
(45) Date of Patent: Feb. 23, 2016

(54) SYNTHESIS AND USE OF MOLECULAR SIEVE ITQ-32

(71) Applicants: Allen W. Burton, Stewartsville, NJ (US); Simon C. Weston, Annandale, NJ (US); Karl G. Strohmaier, Port Murray, NJ (US); Hilda B. Vroman, Piscataway, NJ (US)

(72) Inventors: Allen W. Burton, Stewartsville, NJ (US); Simon C. Weston, Annandale, NJ (US); Karl G. Strohmaier, Port Murray, NJ (US); Hilda B. Vroman, Piscataway, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 14/077,426

(22) Filed: Nov. 12, 2013

(65) Prior Publication Data

US 2014/0163228 A1   Jun. 12, 2014

Related U.S. Application Data

(60) Provisional application No. 61/735,133, filed on Dec. 10, 2012.

(51) Int. Cl.
| | | |
|---|---|---|
| *B01J 20/18* | (2006.01) | |
| *B01J 20/22* | (2006.01) | |
| *B01J 31/22* | (2006.01) | |
| *C01B 39/48* | (2006.01) | |
| *B01D 53/02* | (2006.01) | |
| *B01J 29/70* | (2006.01) | |
| *B01J 29/76* | (2006.01) | |
| *B01J 29/78* | (2006.01) | |
| *B01J 35/00* | (2006.01) | |
| *B01J 35/10* | (2006.01) | |

(52) U.S. Cl.
CPC ............ *B01J 20/226* (2013.01); *B01D 53/02* (2013.01); *B01J 20/186* (2013.01); *B01J 29/70* (2013.01); *B01J 29/76* (2013.01); *B01J 29/78* (2013.01); *B01J 31/22* (2013.01); *B01J 35/002* (2013.01); *B01J 35/1014* (2013.01); *B01J 35/1038* (2013.01); *C01B 39/48* (2013.01); *B01D 2253/116* (2013.01); *B01D 2256/245* (2013.01); *B01D 2257/504* (2013.01); *Y02C 10/08* (2013.01); *Y02P 20/152* (2015.11)

(58) Field of Classification Search
CPC ........................ C07D 295/023; B01J 20/226
See application file for complete search history.

(56) References Cited

U.S. PATENT DOCUMENTS

| | | | |
|---|---|---|---|
| 4,016,218 A | 4/1977 | Haag et al. | |
| 7,582,278 B2 | 9/2009 | Corma Canos et al. | |
| 2009/0068092 A1* | 3/2009 | Canos et al. | 423/706 |
| 2009/0202416 A1* | 8/2009 | Garcia et al. | 423/351 |
| 2009/0318696 A1 | 12/2009 | Strohmaier et al. | |

OTHER PUBLICATIONS

Cantin, A., et al. "Synthesis and Structure of the Bidimensional Zeolite ITQ-32 with Small and Large Pores." J. Am. Chem. Soc. (2005), vol. 127, pp. 11560-11561.*
American Chemical Society. "Supporting Information." Available from: <http://pubs.acs.org/doi/suppl/10.1021/ja053040h/supp_file/ja053040hsi20050708_053444.pdf>, S1-S12.*
American Chemical Society. © 2010. "Supporting Information." Available from: < http://pubs.acs.org/doi/suppl/10.1021/ja053040h/suppl_file/ja053040hsi20050708_053444.pdf>, S1-S12.*
Cantin, A., Corma, A., Leiva, S., Rey, F., Rius, J. and Valencia, S., "Synthesis and Structure of the Bidimensional Zeolite ITQ-32 with Small and Large Pores", Journal of the American Chemical Society, Jul. 30, 2005, vol. 127, No. 33, pp. 11560-11561.
International Search Report with Written Opinion for PCT/US2013/069577 dated May 12, 2014.

* cited by examiner

*Primary Examiner* — Noble Jarrell
*Assistant Examiner* — John S Kenyon
(74) *Attorney, Agent, or Firm* — David M. Weisberg

(57) ABSTRACT

The present invention relates to molecular sieves having the structure of ITQ-32 is synthesized from a reaction mixture substantially free of fluoride ions and comprising 4,4-dimethyl, 1-cyclohexyl-piperazinium cations in its pore structure, as well as methods of making such molecular sieves and methods of using them.

17 Claims, 2 Drawing Sheets

SYNTHESIS AND USE OF MOLECULAR SIEVE ITQ-32

CROSS-REFERENCE TO RELATED APPLICATIONS

This application claims the benefit of U.S. Application Ser. No. 61/735,133, filed on Dec. 10, 2012; which is incorporated by reference herein in its entirety.

FIELD OF THE INVENTION

This invention relates to the synthesis of ITQ-32 and use of the resultant molecular sieve as an adsorbent and a catalyst for organic conversion reactions.

BACKGROUND OF THE INVENTION

ITQ-32 is a molecular sieve having a two-dimensional pore system comprising cages linked through windows of 8-membered rings of tetrahedrally coordinated atoms. Although the widest cross section of the large cages is circumscribed by 12-rings, these 12-rings can only be accessed by diffusion through the 8-ring channels. ITQ-32 has been assigned the framework type IHW by the Structure Commission of the International Zeolite Association.

ITQ-32 is of interest for the separation of small molecular species like carbon dioxide and methane because of the small dimensions of its pores (3.5 Å×4.3 Å). This and other separations using ITQ-32 are described in, for example, U.S. Patent Application Publication No. 2009/0202416.

The characteristic X-ray diffraction pattern of ITQ-32 and its synthesis in the presence of N,N,N',N'-tetramethyldecahydrocyclobuta[1,2-c;3,4-c']dipyrrolidinium and 4,4-dimethyl,1-cyclohexylpiperazinium cations as organic structure directing agents are disclosed in U.S. Pat. No. 7,582,278. However, the synthesis mixtures described in U.S. Pat. No. 7,582,278 require the presence of fluoride ions, which in commercial scale operations is disadvantageous in that they may lead to extra safety and cost considerations. There is, therefore, interest in synthesizing ITQ-32 in the absence of fluoride ions.

According to the present invention, it has now been found that ITQ-32, particularly in a borosilicate form, can be prepared in the absence of fluoride. The fluoride-free synthesis can be effected using 4,4-dimethyl,1-cyclohexylpiperazinium as the organic structure directing agent. The synthesis can be accomplished in the absence of alkali metal cations thereby obviating the need for ion-exchange of the product after calcination to remove the occluded organic structure directing agent.

SUMMARY OF THE INVENTION

In one aspect, the invention resides in a molecular sieve having the structure of ITQ-32 and, in its as-synthesized form, being substantially free of fluoride ions.

In one embodiment, the molecular sieve comprises 4,4-dimethyl,1-cyclohexylpiperazinium cations in its pores.

In one embodiment, the as-synthesized molecular sieve has a composition comprising the molar relationship $qQ^+:xX_2O_3:SiO_2$ (normalized to ~1.0 silica content) wherein $0<q\leq0.06$, $0\leq x\leq0.05$, $Q^+$ comprises a 4,4-dimethyl,1-cyclohexylpiperazinium cation, and X comprises a trivalent element, such as at least one of aluminum, boron, chromium, gallium, and iron, desirably including or being boron.

In a further aspect, the invention resides in a process for producing a molecular sieve having the structure of ITQ-32, the process comprising: (i) preparing a synthesis mixture capable of forming said molecular sieve and comprising water, a source of silica, a source of a trivalent element (X), and a source of 4,4-dimethyl,1-cyclohexylpiperazinium cations ($Q^+$), said synthesis mixture being substantially free of fluoride ions and having a composition, in terms of molar ratios, within the following amounts: $SiO_2/X_2O_3$ from about 2 to about 100; $Q^+/SiO_2$ from about 0.02 to about 1.0; and $H_2O/SiO_2$ from about 10 to about 60; (ii) heating said mixture under crystallization conditions comprising a temperature of from about 100° C. to about 200° C. and a time from about 1 day to about 28 days until crystals of said molecular sieve are formed; and (iii) recovering said molecular sieve from step (ii).

In one embodiment, the synthesis mixture comprises a source of chloride ions, desirably such that the $Cl^-/SiO_2$ molar ratio of said synthesis mixture is (non-zero and) up to about 0.3.

DETAILED DESCRIPTION OF THE EMBODIMENTS

Figure 1:
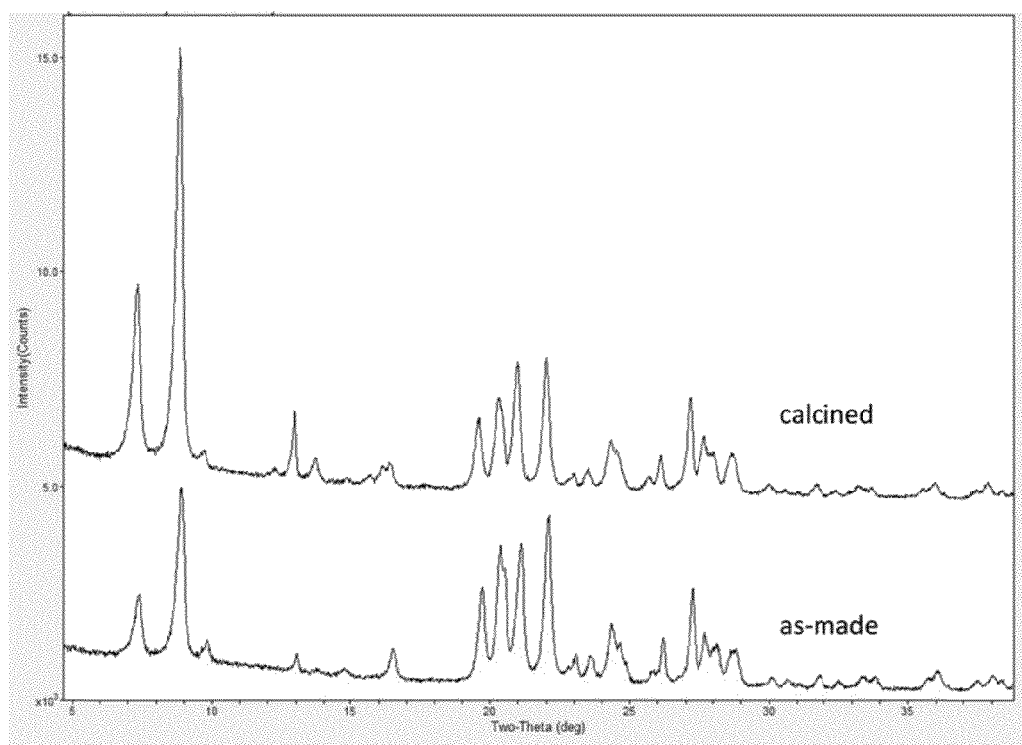
FIG. 1 shows the powder XRD patterns of the as-made and calcined forms of the borosilicate ITQ-32 produced in Example 2.

Described herein is a process for the synthesis of the molecular sieve ITQ-32 from a synthesis mixture which is substantially free of fluoride ions and optionally may contain other halide ions, particularly chloride ions. As used herein, the term "substantially free of fluoride ions" means that the synthesis mixture contains less than 100 wppm, e.g., less than 50 wppm, less than 25 wppm, less than 10 wppm, or no measurable quantity, of fluoride ions.

The present synthesis employs 4,4-dimethyl,1-cyclohexylpiperazinium cations as a structure directing agent, and the processes described herein can produce ITQ-32 material having, in its as-synthesized form, a composition comprising the molar relationship: $qQ^+:xX_2O_3:SiO_2$, wherein $0<q\leq0.06$, $0\leq x\leq0.05$, $Q^+$ comprises a 4,4-dimethyl,1-cyclohexylpiperazinium cation, and X comprises a trivalent element, such as at least one of aluminum, boron, chromium, gallium, and iron. In one embodiment, boron is present in the as-synthesized molecular sieve, either alone or in combination with one or more other trivalent elements, such as aluminum. It should be understood that the molar relationship above was normalized to the content of the silica component, such that the (absent) coefficient for silica is meant to be ~1.0.

In its as-synthesized form, the ITQ-32 produced by the present process can exhibit an X-ray diffraction (XRD) spectrum including the characteristic peak maxima listed in Table 1 below.

TABLE 1

| Two-theta (degrees) ± 0.3 | Relative Intensity (100 × I/Io) |
|---|---|
| 7.3 | m-s |
| 8.8 | vs |
| 9.7 | w |
| 16.4 | w-m |
| 19.6 | s |
| 20.2 | s-vs |

TABLE 1-continued

| Two-theta (degrees) ± 0.3 | Relative Intensity (100 × I/Io) |
|---|---|
| 21.0 | s-vs |
| 21.9 | vs |
| 24.2 | m |
| 26.0 | m |
| 27.0 | m-s |
| 27.5 | m |

After calcination to remove the organic material $Q^+$ occluded in its pores, the ITQ-32 produced by the present process can have an XRD pattern including the characteristic peak maxima listed in Table 2 below.

TABLE 2

| Two-theta (degrees) ± 0.3 | Relative Intensity (100 × I/Io) |
|---|---|
| 7.4 | s-vs |
| 8.9 | vs |
| 9.7 | w |
| 12.9 | w |
| 19.3 | w |
| 20.3 | w-m |
| 20.9 | m |
| 22.0 | m |
| 24.3 | w |
| 26.0 | w-m |
| 27.1 | m |
| 27.6 | w |

The X-ray diffraction data reported herein were collected with a Panalytical X'Pert Pro diffraction system with an Xcelerator multichannel detector, equipped with a germanium solid state detector, using copper K-alpha radiation. The diffraction data were recorded by step-scanning at 0.02 degrees of two-theta, where theta is the Bragg angle, and using an effective counting time of 2 seconds for each step. The interplanar spacings, d-spacings, were calculated in Angstrom units, and the relative intensities of the lines, $I/I_o$ is the ratio of the peak intensity to that of the intensity of the strongest line, above background. The intensities are uncorrected for Lorentz and polarization effects. The relative intensities are given in terms of the symbols "vs"=very strong (60-100%), "s"=strong (40-60%), "m"=medium (20-40%), and "w"=weak (0-20%). In certain cases, some (select) or all weak peaks listed may have non-zero intensities.

The ITQ-32 described herein can be produced from a synthesis mixture comprising water, a source of silica, a source of a trivalent element (X), and a source of 4,4-dimethyl,1-cyclohexylpiperazinium cations ($Q^+$), wherein the synthesis mixture can be substantially free of fluoride ions and can have a composition, in terms of molar ratios, within the following amounts:

| Reactants | Useful | Preferred |
|---|---|---|
| $SiO_2/X_2O_3$ | 2-100 | 8-30 |
| $Q^+/SiO_2$ | 0.02-1.0 | 0.025-0.6; and |
| $H_2O/SiO_2$ | 10-60 | 15-40. |

Suitable sources of silica in the above mixture can include, but are not necessarily limited to, colloidal suspensions of silica, precipitated silicas, alkali metal silicates, tetraalkylorthosilicates, silicon hydroxides, silicon oxy-hydroxides, and the like, and combinations thereof. Suitable sources of the trivalent element X can depend on the relevant trivalent element(s) employed but, in the case of boron, can include but are not necessarily limited to boric acid, sodium borate, potassium borate, boron oxide, and combinations thereof. Suitable sources of aluminum, when present, can include but are not necessarily limited to hydrated alumina (also called aluminum hydroxides), aluminum oxide, aluminum oxy-hydroxides, water-soluble aluminum salts such as aluminum nitrate, and combinations thereof.

Suitable sources of $Q^+$ can include the hydroxides, halides (e.g., chloride, bromide, and/or iodide), and/or other salts of the relevant quaternary ammonium compound.

In some embodiments, the synthesis mixture can comprise a source of chloride ions, for example such that the $Cl^-/SiO_2$ molar ratio of said synthesis mixture can be (non-zero and) up to about 0.3.

Though the pH of the synthesis mixture may not necessarily be critical, it can be highly dependent on the combination of various different components in the synthesis mixture. While pH values can extend from 7.5 to 14, it can sometimes be difficult to attain relatively high yield and/or relatively high purity at lower pH values in the synthesis mixture. Nevertheless, in certain embodiments, the pH of the synthesis mixture can be relatively low, e.g., from 8 to 10, while still allowing substantially fluoride-free ITQ-32 product to be effectively made.

In some embodiments, the synthesis mixture may also include seeds of a molecular sieve material, such as ITQ-32 from a previous synthesis, e.g., in an amount from about 0.1 wt % to about 10 wt % or from about 0.5 wt % to about 5 wt % of the synthesis mixture. Additionally or alternately, when seeds such as ITQ-32 seeds are present in the synthesis mixture, they can be present in an amount from about 0.1 wt % to about 10 wt % or from about 0.5 wt % to about 5 wt % of the silica component of the synthesis mixture.

Crystallization of ITQ-32 from the synthesis mixture described herein can be carried out at static or stirred conditions in a suitable reactor vessel (e.g., polypropylene jars or Teflon™-lined or stainless steel autoclaves) at a temperature from about 100° C. to about 200° C., such as from about 140° C. to about 180° C., for a time sufficient for crystallization to occur at the temperature used (e.g., from about 12 hours to about 100 days, from about 1 day to about 7 days, or from about 2 days to about 20 days). Thereafter, the crystals can be separated from the liquid and recovered. It should be appreciated that not all of the trivalent element present in the synthesis mixture may be transferred to the framework of the molecular sieve, such that the $SiO_2/X_2O_3$ molar ratio of the ITQ-32 product may indeed be higher than that of the synthesis mixture. The same can be true with one or more other components of the synthesis mixture.

Using the synthesis mixture and processes described herein, it is possible to synthesize ITQ-32 that may not only be substantially free of fluoride ions in its as-synthesized form, but that can also contain less than 25 wt % (e.g., contain less than 20 wt %, contain less than 15 wt %, contain less than 11 wt %, or be substantially free) of large pore molecular sieve/zeolite materials (such as ZSM-12), e.g., as measured by XRD techniques. Large pore molecular sieve/zeolite materials, as used herein, have a microporous structure with at least one pore opening cross-sectional dimension being greater than 6 Å. As used herein, the term "substantially free of large pore" materials means that the product contains less than 10 wt %, e.g., less than 8 wt %, less than 6 wt %, less than 5 wt %, less than 4 wt %, less than 3 wt %, or no detectable quantity by XRD techniques), of large pore materials, which can include, but are not necessarily limited to, ZSM-12 and the like. Being a relatively large pore molecular sieve, ZSM-12 can be a relatively undesirable impurity when ITQ-32 is used for adsorption applications. Indeed, it is additionally or alternately possible to synthesize ITQ-32 product using the synthesis mixture and/or processes described herein so as to attain less than 25 wt % (e.g., less than 20 wt %, less than 15 wt %, less than 11 wt %, less than 10 wt %, less than 8 wt %, less than 6 wt %, less than 5 wt %, less than 4 wt %, less than 3 wt %, or no detectable quantity) of impurity (non-ITQ-32) phases, e.g., by XRD techniques.

In one embodiment, the ITQ-32 product synthesized by the present process can comprise silicon and boron in an atomic ratio (Si/B) of greater than 7, e.g., greater than 8.

The as-synthesized ITQ-32 product may also be subjected to treatment to remove and/or decompose all or part of the organic directing agent Q used in its synthesis. This can be conveniently accomplished by thermal treatment, in which the as-synthesized material can be heated to a temperature of at least about 370° C. for at least 1 minute and generally not longer than 20 hours. While subatmospheric pressure can be employed for the thermal treatment, atmospheric pressure can be desired for reasons of convenience. The thermal treatment can be performed at a convenient and effective temperature, e.g., up to about 925° C. The thermally treated product, especially in its metal, hydrogen, and ammonium forms, can be particularly useful as an adsorbent and/or in the catalysis of certain organic (e.g., hydrocarbon) conversion reactions.

The present synthesis of ITQ-32 can be accomplished in the absence of alkali metal cations, thereby obviating the need for ion-exchange of the product after thermal treatment to remove any occluded structure directing agent. However, depending on the $X_2O_3/SiO_2$ molar ratio of the material, any cations in the as-synthesized ITQ-32 can be replaced in accordance with techniques well known in the art, e.g., by ion exchange with other cations. Preferred replacing cations can include, but are not necessarily limited to, metal ions, hydrogen ions, hydrogen precursor (e.g., ammonium) ions, and mixtures thereof. Particularly preferred cations can include those that can tailor the catalytic activity for adsorption and/or for certain hydrocarbon conversion reactions (e.g., hydrogen, rare earth metals, and/or one or more metals of Groups 2-15 of the Periodic Table of the Elements). As used herein, the numbering scheme for the Periodic Table Groups is as disclosed in Chemical and Engineering News, 63(5), 27 (1985).

ITQ-32, as produced herein, may be intimately combined with a hydrogenating component, such as molybdenum, rhenium, nickel, cobalt, chromium, manganese, and/or noble metal (such as platinum and/or palladium), where a hydrogenation-dehydrogenation function may be desirable to perform. Such component can be in the composition by way of co-crystallization, exchanged into the composition (to the extent a trivalent element, e.g., boron, is present in the structure), impregnated therein, and/or intimately physically admixed therewith. Such component can be impregnated in/on to the composition, e.g., in the case of platinum, by treating the silicate with a solution containing a platinum metal-containing ion. Thus, suitable platinum compounds for such purpose can include chloroplatinic acid, platinous chloride, and/or various compounds containing the platinum amine complex.

The present molecular sieve, when employed as an adsorbent and/or as a catalyst, can generally be at least partially dehydrated. This can be done, e.g., by heating to a temperature from about 120° C. to about 400° C. (e.g., from about 200° C. to about 370° C.) in an atmosphere such as air, nitrogen, etc., and at atmospheric, subatmospheric, or superatmospheric pressures for an appropriate time (e.g., from about 15 minutes to about 48 hours). Dehydration can alternately be performed at room temperature (~20-25° C.) merely by placing the ITQ-32 in a vacuum, but a longer time may be required to sufficiently dehydrate.

The ITQ-32 described herein can be particularly useful as an adsorbent in separating a first component, such as carbon dioxide, from a gaseous mixture comprising the first component and an additional second component, such as methane.

Additionally or alternately, the present invention can include one or more of the following embodiments.

Embodiment 1

A molecular sieve having the structure of ITQ-32 and, in its as-synthesized form, being substantially free of fluoride ions.

Embodiment 2

The molecular sieve of embodiment 1, which comprises silicon and boron in an atomic ratio (Si/B) greater than 8:1.

Embodiment 3

The molecular sieve of embodiment 1 or embodiment 2, wherein the molecular sieve is substantially free of large pore molecular sieve materials, such as ZSM-12.

Embodiment 4

The molecular sieve of any one of the previous embodiments, further comprising 4,4-dimethyl,1-cyclohexylpiperazinium cations in its pore structure.

Embodiment 5

The molecular sieve of embodiment 4, which has a composition comprising the molar relationship: $qQ^+:xX_2O_3:SiO_2$, wherein $0<q\leq0.06$, $0\leq x\leq0.05$, $Q^+$ comprises a 4,4-dimethyl,1-cyclohexylpiperazinium cation, and X comprises a trivalent element (e.g., comprising at least one of aluminum, boron, chromium, gallium, and iron, such as comprising at least boron and/or aluminum).

Embodiment 6

A process for producing a molecular sieve having the structure of ITQ-32 and/or a molecular sieve according to any one of the previous embodiments, the process comprising: (i) preparing a synthesis mixture capable of forming the molecular sieve and comprising water, a source of silica, a source of a trivalent element (X), and a source of 4,4-dimethyl,1-cyclohexylpiperazinium cations ($Q^+$), the synthesis mixture being substantially free of fluoride ions and having a composition wherein: an $SiO_2/X_2O_3$ ratio is from about 2 to about 100; a $Q^+/SiO_2$ ratio is from about 0.02 to about 1.0; and an $H_2O/SiO_2$ ratio is from about 10 to about 60; (ii) heating the mixture under crystallization conditions comprising a temperature of from about 100° C. to about 200° C. and a time from about 1 day to about 28 days until crystals of the molecular sieve are formed; and (iii) recovering the molecular sieve from step (ii).

Embodiment 7

The process of embodiment 6, wherein the synthesis mixture comprises a source of chloride ions.

Embodiment 8

The process of embodiment 7, wherein the synthesis mixture exhibits a (non-zero) $Cl^-/SiO_2$ molar ratio up to about 0.3.

Embodiment 9

The process of any one of embodiments 6-8, wherein the synthesis mixture also contains seeds, e.g., from about 0.01 wppm to about 10000 wppm seeds or from about 100 wppm to about 5000 wppm seeds.

Embodiment 10

The process of embodiment 9, wherein the seeds comprise a crystalline material having the structure of ITQ-32.

Embodiment 11

The process of any one of embodiments 6-10, further comprising removing and/or decomposing at least part of the organic material from the molecular sieve crystals recovered in step (iii).

Embodiment 12

A molecular sieve produced by the process of any one of embodiments 6-11.

Embodiment 13

A process for separating a first component from a gaseous mixture comprising said first component and a second component, the process comprising contacting the gaseous mixture with the molecular sieve of any one of embodiments 1-4 or 12.

Embodiment 14

The process of embodiment 13, wherein the first component comprises carbon dioxide and the second component comprises methane.

The invention will now be more particularly described with reference to the following Examples and the accompanying drawings.

EXAMPLES

In the Examples, the alpha test is a measure of molecular sieve acidic functionality and is described together with details of its measurement in U.S. Pat. No. 4,016,218, and in J. Catalysis, Vol. VI, pp. 278-287 (1966).

Example 1

A reaction mixture was prepared in a sealed 1-mL stainless steel reactor vessel with the following mole ratios using boric acid as the boron source, Ludox™ AS-40 as the silica source, and substantially no fluoride ions: SDA/Si≈0.2; Si/B≈5; HCl/Si≈0.10; and $H_2O$/Si≈35. 4,4-dimethyl,1-cyclohexylpiperazinium hydroxide was used as the structure directing agent (SDA).

The reaction mixture was heated in a convection oven under tumbling conditions (~30 rpm) for about 28 days at ~160° C. The sample was worked up by a series of three centrifugations and washings with deionized water. Powder XRD of the product appeared to indicate substantially pure phase ITQ-32.

Example 2

Figure 2:
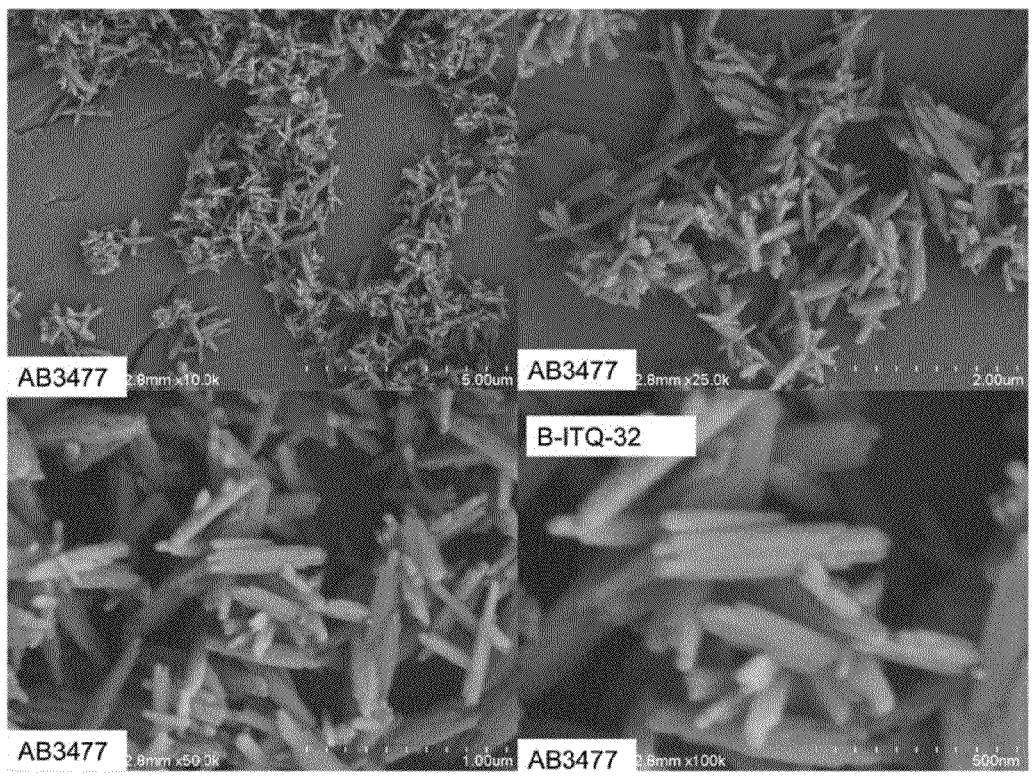
FIG. 2 provides SEM images of the borosilicate ITQ-32 produced in Example 2. Magnification increases from left to right and top to bottom within the four images.

First, ~5.1 grams deionized water were added to ~2.20 grams of 1,1-dimethyl-4-cyclohexylpiperazinium hydroxide (29.2%) inside a Teflon™ liner for a ~23-mL steel Parr autoclave. Next, ~0.19 grams boric acid was added to the solution and mixed manually with a spatula until near dissolution. In the next step, ~1.50 grams of 1 N HCl and then ~2.25 grams of Ludox™ AS-40 were added to the solution and mixed to create a relatively uniform suspension having the same molar ratios as the reaction mixture of Example 1. About 0.04 grams of seeds from the Example 1 product were added. The liner was then capped, sealed inside the ~23-mL autoclave, and heated to ~160° C. under tumbling conditions (~50 rpm). After about 14 days of heating, the reaction was quenched, and the solids were isolated by filtering through a Buchner funnel, washing with deionized water, and drying in a vacuum oven at ~60° C. The yield of solid product was ~1.02 grams. Powder XRD of the product appeared to indicate substantially pure phase ITQ-32. FIG. 1 shows the powder XRD patterns of the as-made and calcined forms of the product of Example 2. FIG. 2 shows SEM images of the product of Example 2.

The calcined form of the product of Example 2 was heated inside a muffle furnace from ambient temperature (~20-25° C.) to about 400° C. at a heating rate of ~4° C./min under a nitrogen atmosphere, heated to about 600° C. at a heating rate of ~4° C./min in air, and then maintained at about 600° C. in air for about another 2 hours. The calcined product was then measured with nitrogen physisorption and the data were analyzed using the t-plot method. The micropore volume was determined to be ~0.16 $cm^3/g$, and the external (mesopore) surface area was determined to be about 52 $m^2/g$.

Example 3

Example 2 was repeated, except that ~0.023 grams of aluminum hydroxide and ~0.06 g of the products seeds from Example 2 were included in the synthesis mixture. The yield of solid product after about 14 days crystallization was ~1.05 grams, and powder XRD of the product appeared to indicate substantially pure phase ITQ-32. This sample was calcined and then alpha tested for n-hexane cracking activity. The alpha value of the sample was determined to be ~6.

Example 4

Example 2 was repeated, except that no 1 N HCl was added. Additional deionized water was added to maintain the same $H_2O$/Si level. After ~8 days of heating, the product appeared (by XRD) to be substantially pure phase ITQ-32.

Example 5

Example 4 was repeated, except that ~0.018 grams of sodium chloride was included in the synthesis mixture. After ~7 days of heating, the product appeared (by XRD) to be substantially pure phase ITQ-32.

Example 6

Example 3 was repeated, except that ~0.033 grams of aluminum hydroxide was included in the synthesis mixture to give an initial Si/Al ratio of ~35 and an initial Si/B ratio of ~5. After ~9 days of heating, the product appeared (by XRD) to comprise predominantly ITQ-32 with a minor gibbsite impurity.

Example 7

Example 2 was repeated, but without boron and with sufficient aluminum hydroxide included in the synthesis mixture to give an initial Si/Al ratio of ~20. The product appeared (by XRD) to be amorphous after heating for ~17 days.

Although the present invention has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the invention.

What is claimed is:

1. A molecular sieve having the structure of ITQ-32 and, in its as-synthesized form, being substantially free of fluoride ions.

2. The molecular sieve of claim 1, which comprises silicon and boron in an atomic ratio (Si/B) greater than 8:1.

3. The molecular sieve of claim 1, wherein the molecular sieve is substantially free of ZSM-12.

4. A molecular sieve having the structure of ITQ-32 and, in its as-synthesized form, being substantially free of fluoride ions and comprising 4,4-dimethyl,1-cyclohexylpiperazinium cations in its pore structure.

5. The molecular sieve of claim 4, which has a composition comprising the molar relationship: $qQ^+:xX_2O_3:SiO_2$, wherein $0<q\leq0.06$, $0\leq x\leq0.05$, $Q^+$ comprises a 4,4-dimethyl,1-cyclohexylpiperazinium cation, and X comprises a trivalent element.

6. The molecular sieve of claim 5, wherein the trivalent element X comprises at least one of aluminum, boron, chromium, gallium and iron.

7. The molecular sieve of claim 5, wherein the trivalent element X comprises boron.

8. A process for producing a molecular sieve having the structure of ITQ-32, the process comprising:
   (i) preparing a synthesis mixture capable of forming said molecular sieve and comprising water, a source of silica, a source of a trivalent element (X), and a source of 4,4-dimethyl,1-cyclohexylpiperazinium cations ($Q^+$), the synthesis mixture being substantially free of fluoride ions and having a composition, in terms of molar ratios, within the following amounts:

| | |
|---|---|
| $SiO_2/X_2O_3$ | about 2 to about 100; |
| $Q^+/SiO_2$ | about 0.02 to about 1.0; and |
| $H_2O/SiO_2$ | about 10 to about 60; |

(ii) heating the mixture under crystallization conditions comprising a temperature of from about 100° C. to about 200° C. and a time from about 1 day to about 28 days until crystals of the molecular sieve are formed; and
   (iii) recovering the molecular sieve from step (ii).

9. The process of claim 8, wherein the trivalent element X comprises at least one of aluminum, boron, chromium, gallium and iron.

10. The process of claim 8, wherein the trivalent element X comprises boron.

11. The process of claim 8, wherein the synthesis mixture comprises a source of chloride ions.

12. The process of claim 11, wherein the synthesis mixture exhibits a $Cl^-/SiO_2$ molar ratio up to about 0.3.

13. The process of claim 8, wherein the synthesis mixture also contains seeds.

14. The process of claim 8, wherein the synthesis mixture comprises from about 0.01 wppm to about 10000 wppm seeds.

15. The process of claim 8, wherein the synthesis mixture comprises from about 100 wppm to about 5000 wppm seeds.

16. The process of claim 15, wherein the seeds comprise a crystalline material having the structure of ITQ-32.

17. The process of claim 8, further comprising removing and/or decomposing at least part of the organic material from the molecular sieve crystals recovered in step (iii).

* * * * *